(12) United States Patent
Van Borselen

(10) Patent No.: US 10,338,250 B2
(45) Date of Patent: Jul. 2, 2019

(54) METHOD OF REMOVING INCOHERENT NOISE

(71) Applicant: PGS Geophysical AS, Oslo (NO)

(72) Inventor: Roald Gunnar Van Borselen, Voorschoten (NL)

(73) Assignee: PGS Geophysical AS, Oslo (NO)

( * ) Notice: Subject to any disclaimer, the term of this patent is extended or adjusted under 35 U.S.C. 154(b) by 930 days.

(21) Appl. No.: 13/903,411

(22) Filed: May 28, 2013

(65) Prior Publication Data

US 2014/0280416 A1 Sep. 18, 2014

Related U.S. Application Data

(60) Provisional application No. 61/784,213, filed on Mar. 14, 2013.

(51) Int. Cl.
  *G01V 1/36* (2006.01)

(52) U.S. Cl.
  CPC ........ *G01V 1/36* (2013.01); *G01V 2210/3248* (2013.01); *G01V 2210/40* (2013.01)

(58) Field of Classification Search
  CPC ................................................ H03H 17/0248
  See application file for complete search history.

(56) References Cited

U.S. PATENT DOCUMENTS

| 5,971,095 | A | 10/1999 | Ozbek |
|---|---|---|---|
| 6,438,069 | B1 | 8/2002 | Ross et al. |
| 6,446,008 | B1 | 9/2002 | Ozbek |
| 6,574,567 | B2 | 6/2003 | Martinez |
| 6,751,559 | B2 | 6/2004 | Fookes et al. |
| 6,894,948 | B2 | 5/2005 | Brittan et al. |
| 7,058,514 | B2 | 6/2006 | Martin et al. |
| 7,545,703 | B2 | 6/2009 | Lunde et al. |
| 7,646,672 | B2 | 1/2010 | Kluver |
| 7,835,225 | B2 | 11/2010 | Sollner et al. |
| 7,869,303 | B2 | 1/2011 | Kinkead |
| 8,089,825 | B2 | 1/2012 | Barr, Jr. et al. |
| 8,339,896 | B2 | 12/2012 | van Borselen et al. |
| 2006/0050612 | A1* | 3/2006 | Zerouk ................. G01V 1/364 367/46 |
| 2010/0315088 | A1 | 12/2010 | Ziolkowski et al. |
| 2011/0051551 | A1 | 3/2011 | Tenghamn |
| 2011/0141849 | A1 | 6/2011 | Brittan |
| 2011/0235464 | A1 | 9/2011 | Brittan et al. |
| 2012/0033526 | A1 | 2/2012 | Hegna et al. |
| 2013/0088938 | A1 | 4/2013 | Aaron et al. |

OTHER PUBLICATIONS

Bekara, Maïza, and Mirko van der Baan. "High-amplitude noise detection by the expectation-maximization algorithm with application to swell-noise attenuation." Geophysics 75.3 (2010): V39-V49.*

* cited by examiner

*Primary Examiner* — Omar F Fernandez Rivas
*Assistant Examiner* — Bijan Mapar
(74) *Attorney, Agent, or Firm* — Patterson + Sheridan LLP

(57) ABSTRACT

Noise is removed from a data set by performing an integral transform operation that converts instances of noise into identifiable artifacts in the transformed data set. A model of the artifacts is constructed by creating a full-domain or partial-domain noise model and performing the same integral transform operation on the noise model. The resulting transformation of the noise model is adaptively subtracted from the transformed data set to remove the noise. The adaptive subtraction may employ a least-square error filter.

23 Claims, 4 Drawing Sheets

METHOD OF REMOVING INCOHERENT NOISE

CROSS-REFERENCE TO RELATED APPLICATIONS

This application claims benefit under 35 U.S.C. § 119(e)(1) of U.S. Provisional Patent Application Ser. No. 61/784,213, filed Mar. 14, 2013, which is incorporated herein by reference.

BACKGROUND

In marine geophysical data acquisition, measurements may be taken of wavefields that have been initiated by geophysical energy sources such as air guns, marine vibrators, electric bipole antennae, and magnetic coils. The geophysical energy sources may be positioned at known locations in a geographic area. In a marine setting, the sources may be towed behind one or more boats traveling a prescribed course, usually a group of equidistant parallel lines. The geophysical sources are caused to emit energy. For example, when the geophysical source is a seismic source, sonic pulses are emitted, and sensors record reflected sonic waves as voltages from transducers. The data received may be compiled into a data set with time and distance along and across the sampling paths. Such data is commonly used to prospect for geologic resources such as oil and gas deposits.

The data set obtained typically contains information of interest indicating the geology of earth strata below the geophysical equipment. Unfortunately, however, the geologic information is usually obscured by substantial noise from a wide variety of sources. Coherent noise sources, such as hydrostatic pressure variations, cavitation of boat propellers, and seismic interference, are usually well-defined and easily removed. Incoherent noise sources, however, such as tugging noise caused by sudden movements of a vessel or sensor due to wave motion, strumming or vibration of cables, and swell noise, are more difficult to remove.

Conventional methods of removing incoherent noise from geophysical data typically employ various rigorous de-noising procedures. These procedures typically involve cascaded applications of various de-spiking and de-noising techniques. A user is often required to iteratively process the data, testing parameters and performing quality control. Such procedures are expensive, time-consuming, and imprecise. If the parameterization is too conservative, noise remains in the data. If the parameterization is too aggressive, geophysical information may be affected. Thus, there is a continuing need for new methods of removing incoherent noise from geophysical data.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
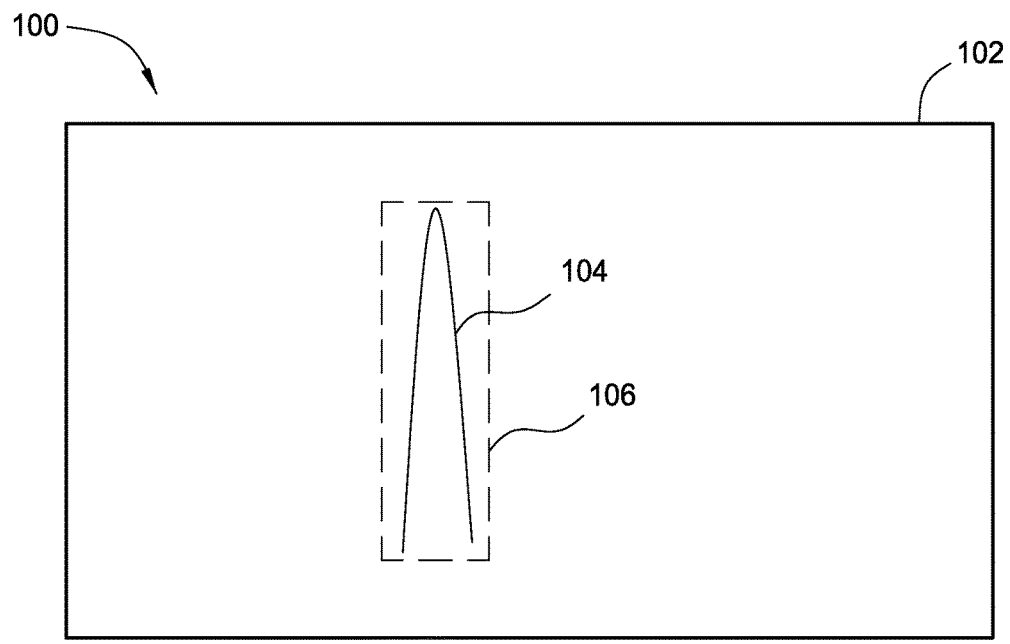
FIG. 1A is a schematic visual representation of a data set having an incoherent noise event.
Figure 1B:
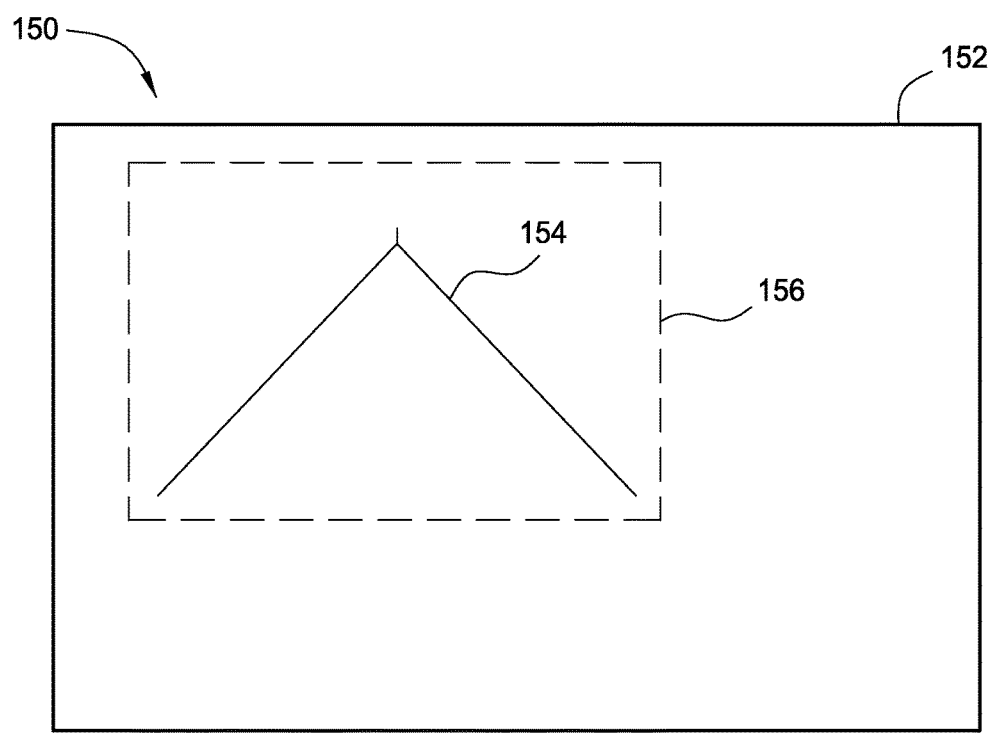
FIG. 1B is a schematic visual representation of a data set that has undergone an integral transform process converting an incoherent noise event into an artefact.

To remove incoherent noise from a data set, the data set may be subjected to a transformation that creates an identifiable pattern from each incoherent noise event. The pattern may be modeled to remove the incoherent noise from the data set. FIG. 1A is a schematic visual representation of a data set 100 having an incoherent noise event 104. The data set 100 has a domain 102 over which the data set 100 is defined, and the incoherent noise event 104 has a subdomain 106, which is a portion of the domain 102 in which the incoherent noise event 104 may be localized. FIG. 1B is a schematic visual representation of a data set 150, which is the data set 100 after an integral operation, such as an integral transform process, has been performed. The data set 150 has a domain 152, which may be the same as the domain 102 or different, depending on the integral operation. The data set 150 contains an artefact 154, which results from applying the integral operation to the incoherent noise event 104, and which is localized in a subdomain 156, which may be the same as the subdomain 106 or different.

A model of the artefact 154 may be constructed by modeling the incoherent noise event 104 and performing the integral operation on the model of the incoherent noise event 104. The artefact 154 may then be substantially removed from the data set 150 by adaptively subtracting the model of the artefact from the data set 150. Multiple artefacts may be removed by repeating the adaptive subtraction using parameterized iterations of the model. Multiple artefacts may also be removed by subtracting coherent events from the data set 100 to yield an incoherent noise set, performing the integral operation on the incoherent noise set to form an artefact set, and adaptively subtracting the artefact set from the data set 150.

The data set 100 may be a geophysical data set, such as a seismic or electromagnetic ("EM") data set, featuring data representing the propagation of energy, such as seismic or EM impulses or waves through a subterranean formation. The data set may be created by generating propagating energy from one or more sources and detecting the resultant energy of interaction with geographic features of the area surveyed using one or more geophysical receivers. Some or all of the sources and receivers may be mobile. For example, sources and/or receivers may be towed through water by one or more vessels. The data set may also be obtained from a vendor of such geophysical data. In a geophysical data set, subtracting coherent events includes identifying signals or events of interest for geophysical exploration and removing them from the data set. What is left is an incoherent noise set.

Figure 1C:
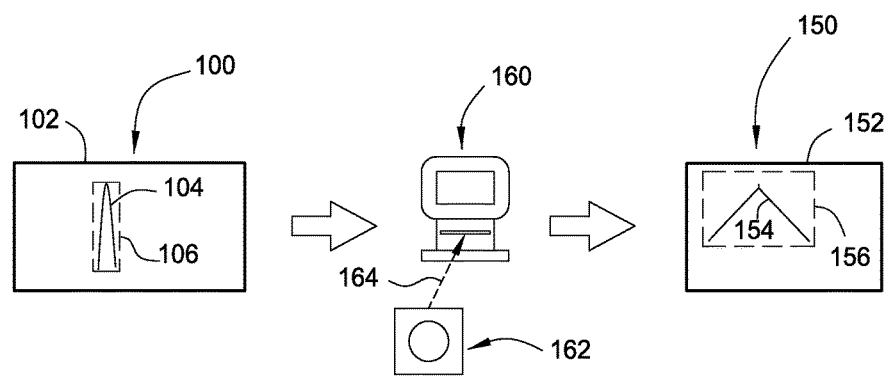
FIG. 1C is a schematic representation of the process of using a computer to perform the integral transform process that converts the data set of FIG. 1A to the data set of FIG. 1B.

FIG. 1C is a schematic representation of the process of using a computer 160 to perform the integral transform process that converts the data set 100 of FIG. 1A to the data set 150 of FIG. 1B. The computer 160 is typically programmed to execute instructions that perform operations on geophysical data, such as the data set 100, to produce data useful for geophysical prospecting. The instructions may cause the computer to perform the methods described below in connection with FIGS. 2A and 2B. A computer-readable medium 162 may also contain such instructions that, when inserted into the computer 160, as illustrated by dotted arrow 164, cause the computer 160 to perform the methods described below. The computer-readable medium 162 typically contains a physical medium, such as a magnetically active substrate, on which the instructions may be recorded for transportation to a computer to be programmed to perform the instructions.

Figure 2A:
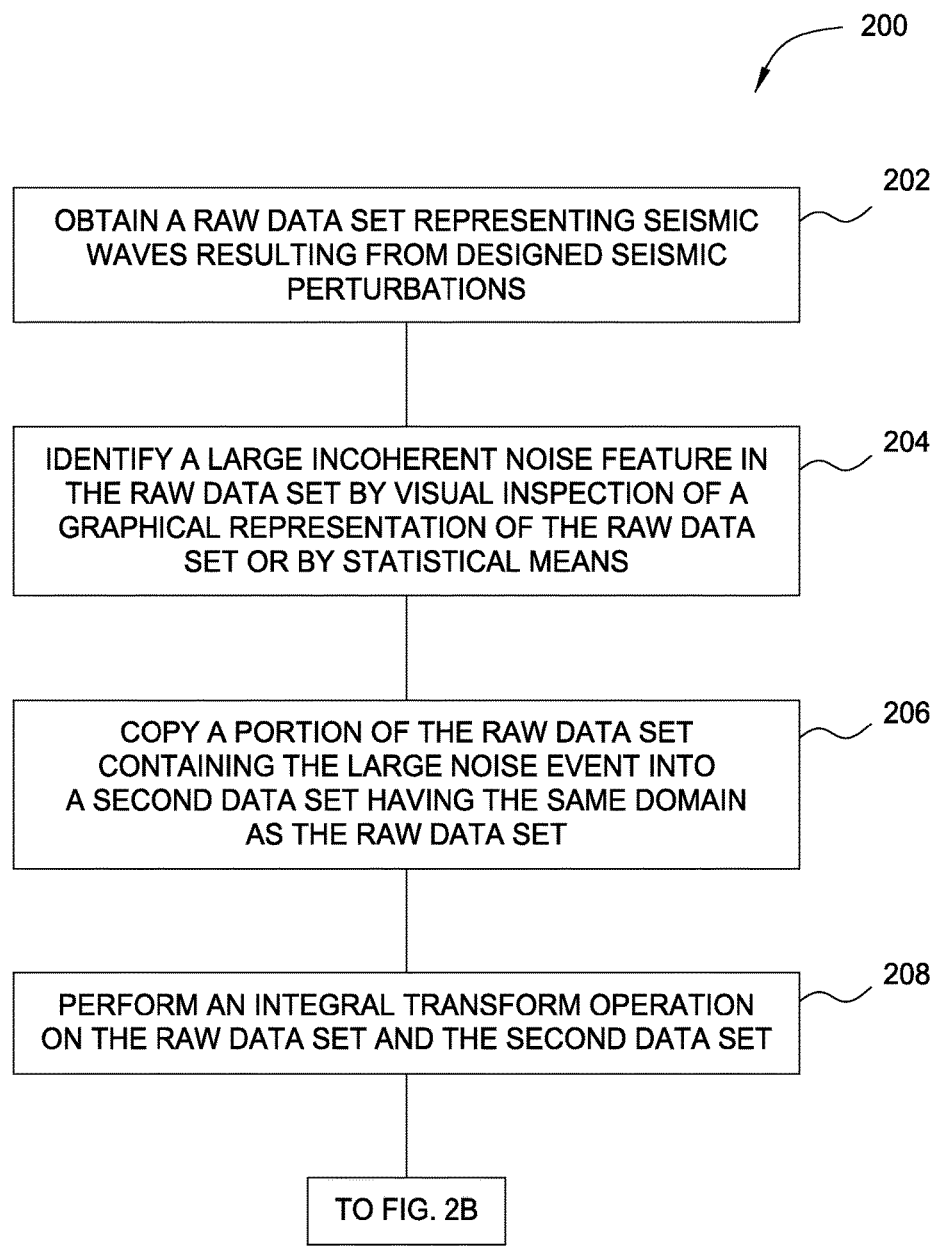
FIGS. 2A and 2B are flow diagrams summarizing a method of removing incoherent noise from a data set.
Figure 2B:
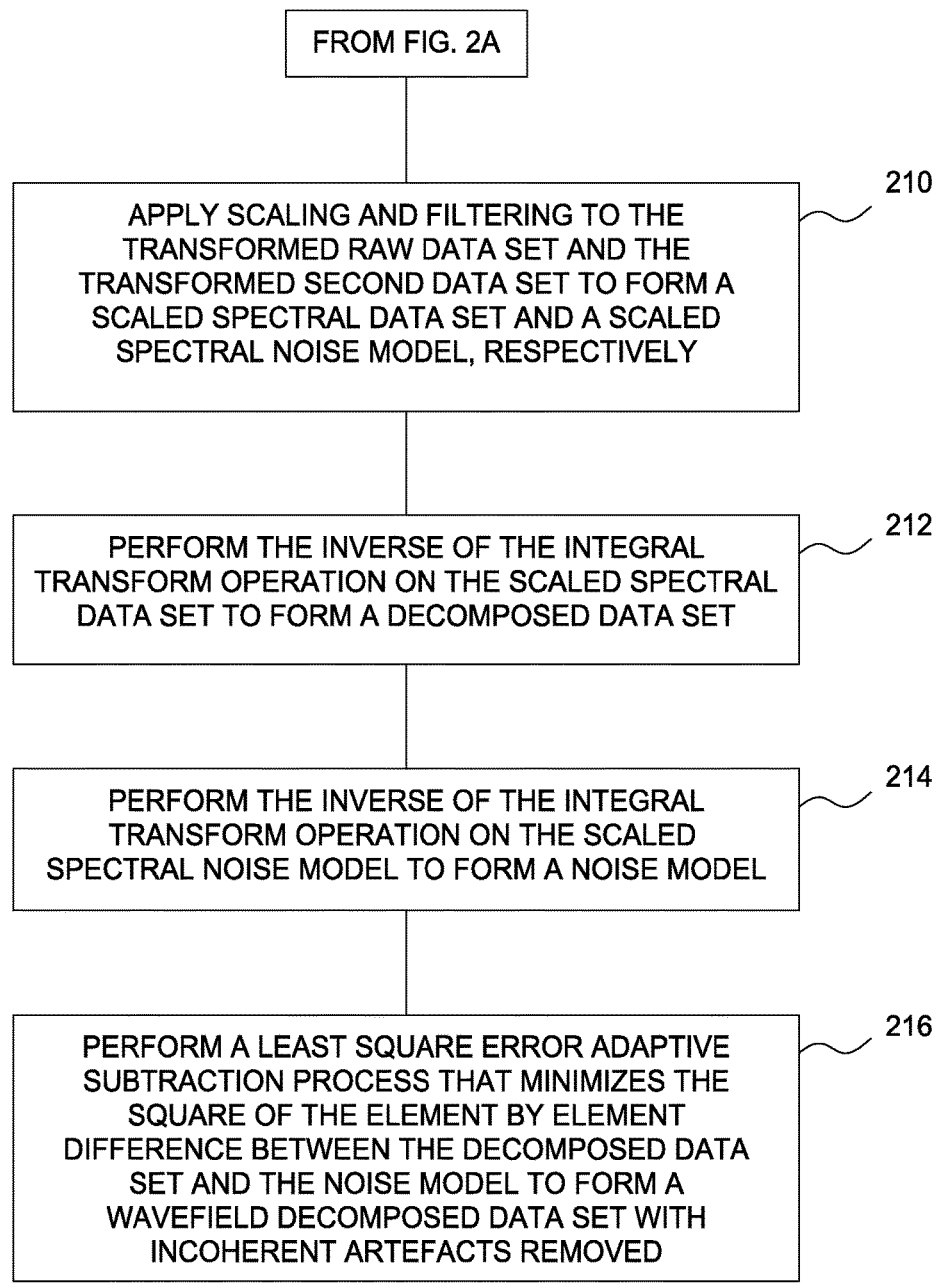

FIGS. 2A and 2B are flow diagrams summarizing a method 200 of removing incoherent noise from a data set. The data set may be a seismic data set, an EM data set, or any other data set including a signal to be preserved along with incoherent noise to be removed. The data set may also contain coherent noise (such as multiple reflection events, also known in the industry as "multiples"), which may be removed, if desired, before or after removing incoherent noise and/or performing wavefield decomposition. The data set is typically indexed according to one or more indices. In general terms, the data set is a tensor X of order N, where N is usually 2 or 3. Relating to seismic data, the indices are typically one or more spatial directions and time. The spatial directions relate to distance along a sampling path and distance from the line of the sampling path, and time relates to the elapsed time at which each seismic amplitude is detected. Typically, the seismic data represents seismic waves resulting from designed seismic perturbations, such as an array of acoustic emitters. Such a raw data set is generated or obtained at 202.

The data set typically has incoherent noise events embedded within. At 204, a large incoherent noise event is identified in the raw data set by depicting the raw data set graphically, for example using a graphical display system, or using statistical means. As described above in connection with FIGS. 1A and 1B, such large incoherent noise events may appear in the raw data set as narrow, statistically significant spikes, or as visually prominent spikes in the graphically depicted data. Statistical means may be employed to identify such spikes by, for example, computing a standard deviation of the data and identifying locations in the data set where data deviate from a norm by a quantity related to the standard deviation. Any suitable statistical means may be used.

At 206, a portion of the raw data set X surrounding and containing the identified large incoherent noise event, such as the subdomain 106 of FIG. 1A, is copied into a second data set S, which may have the same domain as the raw data set X or may be expanded to have the same domain as the raw data set X. The second data set S is a sample of the unfiltered incoherent noise.

In some embodiments, a model of the incoherent energy may be obtained directly as the second data set S by first extracting as much coherent energy from the un-filtered data as possible prior to any transformations or after transformation to a frequency domain. Numerous techniques may be used to extract coherent energy in the space-time domain or in the frequency domain. One such technique is described in Van Borselen, et al. (U.S. Pat. No. 8,339,896), which is incorporated herein by reference. The model of incoherent energy left after removing identifiable coherent energy may be used as a noise extraction in the method 100.

At 208, an integral transform is performed on the raw data set X and the second data set S. The integral transform is an operation of the form:

$$X^T = T(X) = \int_v X f(v) dv$$

$$S^T = T(S) = \int_v S f(v) dv$$

where f(v) is the kernel of the integral transform, and boldface generally denotes a mathematical object that may have non-zero rank, such as a vector. As such, the integral transform may be a multi-dimensional transform. The domain v of the kernel f(v) typically includes the domain of the raw data set X and at least one transform index, each transform index corresponding to an index of the raw data set X. Thus, defining $v = u \cup \alpha$, we may express some integral transforms as $$X^T(\alpha) = T(X(u)) = \int_u X(u) f(u, \alpha) du$$

The corresponding equation may also be written for the second data set S. Commonly used integral transforms that may be used in connection with the method 200 include, but are not limited to, a Fourier transform, a Laplace transform, a Radon transform, a Z transform. For discrete indexed data sets, such transforms are often performed numerically using known algorithms. For seismic applications, the raw data set X and the second data set S are indexed by spatial dimensions and time, so $u = (x_1, x_2, x_3, t)$ where three spatial dimensions are surveyed. Integral transforms such as Laplace and Fourier transforms performed on such data sets typically transform time into frequency and may transform one or more spatial dimensions into wavenumbers or inverse velocities, also referred to as "slowness".

Referring now to FIG. 2B, which contains more operations of the method 200, at 210 scaling and filtering are applied to the transformed raw data set $X^T$ and the transformed second data set $S^T$ to form a scaled spectral data set and a scaled spectral noise model, respectively. Scaling is typically applied using a simple coefficient matrix in the spectral domain, which may approximate any desired function. Filtering may be applied to remove any frequency ranges deemed appropriate. A scaling/filtering function $\Phi$ may be applied as follows:

$$\Xi = X^T \circ \Phi, \Sigma = S^T \circ \Phi$$

where $\Phi$ is a coefficient tensor computed to have a desired effect on the data set, for example, removing certain frequency domains from the data set or applying a patterned transformation to the data set such as an exponential smoothing or filtering, and $\circ$ denotes the Hadamard product or component-wise product.

At 212 and 214, the inverse of the original integral transform is applied to the scaled spectral data set and to the scaled spectral noise model to form a patterned data set and a noise model, respectively. The inverse integral transform is an operation of the form:

$$T^{-1}(\Xi) = \int_w f^{-1}(w) \Xi \, dw$$

where $f^{-1}(w)$ denotes an integral transform kernel that is an inverse of the kernel f(v) with respect to the integral transform. Complimentarily, the domain w of the inverse kernel $f^{-1}$ is typically the same as the domain v of the original kernel f. Thus, the patterned data set and the noise model are given by:

$$D = T^{-1}(\Xi) = \int_w f^{-1}(w) \Xi \, dw = \int_w \int_v f^{-1}(w) \Phi \circ X f(v) dv dw$$

$$N = T^{-1}(\Sigma) = \int_w f^{-1}(w) \Sigma dw = \int_w \int_v f^{-1}(w) \Phi \circ S f(v) dv dw$$

A particular integral transform may be said to be analytic if $T^{-1}T(X)=X$. An integral transform may be said to be quasi-analytic if $T^{-1}T(X) \approx X$. In the case of a quasi-analytic integral transform, $T^{-1}T(X)=X+\partial x$, where $\partial x$ is smaller than a selected threshold criterion.

Incoherent noise in the raw data set X may be observed to create identifiable artefacts in the patterned data set D. The artefacts typically create a pattern in the patterned data set D that may be observed directly in a graphical portrayal of the patterned data set D. As such, the patterned data set D may be said to be a patterned data set.

At 216, a least-squares error adaptive subtraction process is performed that minimizes the square of the element by element difference between the patterned data set and the noise model. A least-squares filter is found that, when applied to the noise model or the patterned data set, minimizes the quantity obtained by subtracting the two data sets, element by element, squaring each element of the result, and adding each squared element together. One example of the least-squares filter that may be used is a Wiener filter. Using the least-squares filter, the noise model is subtracted from the patterned data set to remove incoherent noise from the patterned data set. In the example of the Wiener filter, the filter is a coefficient matrix that is multiplied by the noise model to give a subtrahend, which, when subtracted from the transformed data set, removes an instance of incoherent noise from the transformed data set in an optimal way.

As noted above, the original data set may be a seismic data set, for example a data set of pressure readings as a function of three spatial dimensions and time. The noise model may be constructed by locating a large incoherent noise event in the data set, for example, by statistical analysis or by visual inspection of a graphical representation of the data set rendered by a computer. As such, the noise model does not need to be a precise model of the noise, but may be an estimate. The noise model may be copied from the data set into a new data set representing the noise. After transformation, scaling, and inverse transformation, the noise model can be considered an estimate of the actual noise event, and may be permuted by spatial and temporal offset variables, and a magnitude variable to form a model tensor. The least-squares method described above, for example the Wiener filter method, solves for the values of the offsets and the magnitude that most closely fits the transformed noise model to the largest incoherent noise instance in the transformed data set.

In one embodiment, the process of transforming an original data set and scaling and filtering the transformed data set is a wavefield decomposition process. In a wavefield decomposition process, wave-indicating signals that contain wave train information propagating in different directions are sorted into signals representing the separate wave trains. In one type of wavefield decomposition, geophysical data may be represented as pressure, which is a function of spatial coordinates and time $p(x,t)$, and can be transformed to a frequency domain by computing the Laplace transform over time and the Fourier transform over horizontal spatial coordinates:

$$p^L(x,s) = \int_t e^{-st} p(x,t) dt$$

$$p^F(is\alpha_1, is\alpha_2, x_3, s) = \int_{(x_1, x_2)} e^{is(\alpha_1 x_1 + \alpha_2 x_2)} p^L(x,s) dA$$

where $\alpha_1$ and $\alpha_2$ are components of wave slowness, or reciprocal velocity, in the horizontal directions. The transformed pressure data is then typically scaled by an exponential function of depth, depending on arrangement of sources and receivers. For example, $$P(is\alpha_1, is\alpha_2, x_3, s) = \frac{e^{s\Gamma x_3}}{2\sinh(s\Gamma x_3^R)} p^F(is\alpha_1, is\alpha_2, x_3, s)$$

where $x_3^R$ refers to the depth of a receiver that generated the original data $p(x,t)$ and $$\Gamma = \sqrt{\frac{1}{c^2} + \alpha_1^2 + \alpha_2^2},$$

with $c = \sqrt{\kappa \rho}$, where $\kappa$ is fluid compressibility and $\rho$ is fluid density. The result, $P(is\alpha_2, is\alpha, x_3, s)$, is then transformed back to space and time (reverse Fourier and reverse Laplace) to form a patterned data set $p'(x,t)$. In this embodiment, the patterned data set is a wavefield decomposed data set. Prior to reverse transformation, other filters and scaling operations, such as simple low or high frequency filters, may be applied.

The least-squares filter is typically constructed, as noted above, using a process such as Wiener filtering or L2 energy minimization. The second data set S described above may be a noise extract $n(x,t)$, and may be transformed into a noise model $n'(x,t)$ as described above. In a full-domain non-iterative embodiment, the noise model may then be parameterized by offsets in x and t, and by amplitude A, to form a parametric noise model $\bar{n}(x, \Delta x, t, \Delta t, A)$. A regression filter can then be constructed that minimizes the square of the error, $e_{xt} = p'_{xt} - c^{\Delta x \Delta t A} \bar{n}_{x \Delta x t \Delta t A}$ in tensor notation, where c is the coefficient tensor dimensioned on the offsets $\Delta x$, $\Delta t$, and the amplitude A. Using a parametric noise model in this way enables solving for offsets and amplitudes that determine the most complete removal of all incoherent noise artefacts from the patterned data set in a single regression or least-squares fit, after which the regression filter is applied to the noise model and the result subtracted from the patterned data set. In other embodiments, other methods may be used to generate a noise model without using a regression filter. Examples of such methods include a steepest descent method and a conjugate gradient method.

In a small-domain iterative embodiment, the second data set S may have a domain that is the minimum needed to extract the noise sample, much smaller than the domain of the raw data set X. The second data set S can be transformed into a noise model N with a domain much smaller than the transformed data set D. In such an embodiment, the patterned data set may be divided into windows, each window having a domain that is the same size as the domain of the noise model, and an iterative least-squares fit may be performed that minimizes the difference between the window of data and the noise model on each successive window. For each window, a coefficient tensor for the noise model is computed that minimizes the square of the error in each window. The coefficient tensor is applied to the noise model and the result adaptively subtracted from the patterned data set in each window. The subtraction is adaptive because the noise model is adapted to each window by a least-squares filter over the domain of the window.

In a full-domain iterative embodiment, the second data set S may have a domain equal to the domain of the raw data set X, and after transforming, filtering, and inverse transforming both, a least-squares fit is performed to define a coefficient tensor. The coefficient tensor is applied to the noise model, and the result subtracted from the transformed data to remove one instance of incoherent noise. The process of forming a noise model is then repeated by identifying a second noise instance in the raw data set X, transforming, filtering, and inverting the noise instance, performing a least-squares fit, and removing the second noise instance.

In each iterative embodiment described above, a change parameter may be computed at each iteration that represents the degree of improvement in the overall data each time a noise instance is removed. The iterative process may be repeated so long as the change parameter satisfies a threshold criterion, such as a quantity that defines an end-point of the iterative process. The change parameter may be the sum of all elements in the data set that is adaptively subtracted in each iteration. Alternately, the change parameter may be the sum of all elements of the coefficient tensor.

The various embodiments of the method 200 described above may be performed using a computer or a collection of computers, operating locally or over a network, to perform the mathematical operations. Numerical methods are typically used to perform the integral transforms, the statistical operations, and the least-squares regression and fitting. Using the method 200, noise removal is postponed until after transformation, scaling and filtering, and inverse transformation of the raw data set. The data set obtained after noise removal may be stored on a physical, non-transitory medium for distribution or transportation, if desired.

It should be noted that a synthetic noise event may be used in place of an extracted noise event in all embodiments of the method 200. Any mathematical model of incoherent noise, such as a spike function, impulse function, or Kronecker delta function may be used. The Dirac delta function may also be used, either in the continuously differentiable form:

$$\delta(x) = \frac{1}{a\sqrt{\pi}} e^{-x^2/a^2}$$

or in the non-differentiable form:

$$\delta(x) = \begin{cases} A \text{ at } x = x_0 \\ 0 \text{ at } x \neq x_0 \end{cases}.$$

In such an embodiment, a transformation step may be effectively eliminated by observing that the integral transforms of such functions are typically analytical, so an unscaled and unfiltered noise model may be directly constructed in transform space, if desired.

The synthetic noise model may also be derived from another data set. A noise sample from a first data set may be saved and re-used as a noise sample for processing subsequent data sets.

If the integral transform is analytic, the data set subjected to noise removal may be reverted to its original form, with the noise removed, by reversing the mathematical transformations that produced the patterned data set. After noise removal, the de-noised data set may be transformed, the scaling and filtering operations inverted, and the result inverse transformed to produce the de-noised data in its original format. The same procedure may be performed with quasi-analytic transforms with the result that the de-noised data set is a close representation of the original data set with the noise removed. The transformation and inversion that produces the patterned data set may be referred to as a "forward transformation", and the transformation and inversion that produces the de-noised data in its original format may be referred to as a "backward transformation".

While the foregoing is directed to embodiments of the invention, other and further embodiments of the invention may be devised without departing from the basic scope thereof.

What is claimed is:

1. A method of removing incoherent noise from a raw data set stored on a computer and containing information indicative of a geology of earth strata, comprising:
   using an integral transform operation means to create and store a patterned data set from the raw dataset, wherein:
      the raw data set represents seismic waves resulting from designed seismic perturbations from one or more seismic sources and comprises pressure readings by a plurality of receivers, and
      the integral transform operation means transforms incoherent noise features in the raw data set into artefacts having an identifiable structure in the patterned data set;
   using a modeling means to construct and store a model data set from the raw data set, wherein:
      the model data set contains the incoherent noise features from the raw data set, and
      the model data set, when subjected to the integral transform operation means, produces artefacts similar to the artefacts in the patterned data set;
   using the integral transform operation means to create and store an incoherent noise model from the model data set;
   constructing and storing a scaling and energy minimizing filter from the patterned data set and the incoherent noise model;
   applying the scaling and energy minimizing filter to the incoherent noise model to create and store a filtered incoherent noise model that is scaled with an exponential function of depth depending on an arrangement of the one or more seismic sources and the plurality of receivers; and
   adaptively subtracting the filtered incoherent noise model from the patterned data set to create and store a transformed data set with the incoherent noise features removed.

2. A method of removing incoherent noise from a raw data set stored on a computer and containing information indicative of a geology of earth strata, comprising:
   identifying an incoherent noise feature in the raw data set by depicting the raw data set graphically, the raw data set representing seismic waves resulting from designed seismic perturbations from one or more seismic sources and comprising pressure readings by a plurality of receivers, the raw data set being a function of three spatial dimensions and time;
   creating a second data set by copying a portion of the raw data set into the second data set having a same domain as the raw data set, the portion surrounding and containing the incoherent noise feature;
   performing an integral transform operation on the raw data set to construct and store a transformed raw data set, the integral transform operation being a multi-dimensional transform;
   performing the integral transform operation on the second data set to construct and store a transformed second data set;
   applying scaling and filtering to the transformed raw data set to construct and store a scaled spectral data set, the scaling comprising an exponential function of depth depending on an arrangement of the one or more seismic sources and the plurality of receivers;

applying the scaling and the filtering to the transformed second data set to construct and store a scaled spectral noise model;

performing an inverse of the integral transform operation on the scaled spectral data set to construct and store a wavefield decomposed data set;

performing the inverse of the integral transform operation on the scaled spectral noise model to construct and store a noise model;

performing a least-squares error adaptive subtraction process that minimizes the square of the element by element difference between the wavefield decomposed data set and the noise model to construct and store a wavefield decomposed data set with the incoherent noise feature removed.

3. A method of removing incoherent noise from a raw data set stored on a computer and containing information indicative of a geology of earth strata, comprising:

identifying an incoherent noise feature in the raw data set by depicting the raw data set graphically, the raw data set representing seismic waves resulting from designed seismic perturbations from one or more seismic sources and comprising pressure readings by a plurality of receivers, the raw data set being a function of three spatial dimensions and time;

creating a second data set by copying a portion of the raw data set into the second data set having a same domain as the raw data set, the portion surrounding and containing the incoherent noise feature;

applying an integral transform operation means on the raw data set to construct and store a transformed raw data set, the integral transform operation means being a multi-dimensional transform;

applying the integral transform operation means on the second data set to construct and store a transformed second data set;

applying a scaling and filtering means to the transformed raw data set to construct and store a scaled spectral data set, the scaling comprising an exponential function of depth depending on an arrangement of the one or more seismic sources and the plurality of receivers;

applying the scaling and filtering means to the transformed second data set to construct and store a scaled spectral noise model;

applying an inverse of the integral transform operation means on the scaled spectral data set to construct and store a wavefield decomposed data set;

applying the inverse of the integral transform operation means on the scaled spectral noise model to construct and store a noise model;

applying a least-squares error adaptive subtraction process means that minimizes the square of the element by element difference between the wavefield decomposed data set and the noise model to construct and store a wavefield decomposed data set with the incoherent noise feature removed.

4. An improved method of removing incoherent noise from a raw data set stored on a computer and containing information indicative of a geology of earth strata, the improvement of which comprises: applying scaling to a transformed raw data set, the scaling comprising an exponential function of depth depending on an arrangement of one or more seismic sources and a plurality of receivers, the method comprising:

identifying an incoherent noise feature in the raw data set by depicting the raw data set graphically, the raw data set representing seismic waves resulting from designed seismic perturbations from the one or more seismic sources and comprising pressure readings by the plurality of receivers, the raw data set being a function of three spatial dimensions and time;

creating a second data set by copying a portion of the raw data set into the second data set having a same domain as the raw data set, the portion surrounding and containing the incoherent noise feature;

performing the integral transform operation on the raw data set to construct and store the transformed raw data set, the integral transform operation being a multi-dimensional transform;

performing the integral transform operation on the second data set to construct and store a transformed second data set;

applying the scaling and filtering to the transformed raw data set to construct and store a scaled spectral data set;

applying the scaling and the filtering to the transformed second data set to construct and store the scaled spectral noise model;

performing the inverse of the integral transform operation on the scaled spectral data set to construct and store a wavefield decomposed data set;

performing the inverse of the integral transform operation on the scaled spectral noise model to construct and store a noise model; and performing a least-squares error adaptive subtraction process that minimizes the square of the element by element difference between the wavefield decomposed data set and the noise model to construct and store a wavefield decomposed data set with the incoherent noise feature removed.

5. A method of removing incoherent noise from a stored raw data set containing information indicative of a geology of earth strata, the method comprising:

using a computer to perform an integral transform operation on the raw data set to create and store a patterned data set, wherein:
  the raw data set represents seismic waves resulting from designed seismic perturbations from one or more seismic sources and comprising pressure readings by a plurality of receivers,
  the raw data set is a function of three spatial dimensions and time,
  the integral transform operation transforms incoherent noise features in the raw data set into artefacts having an identifiable structure in the patterned data set, and
  the integral transform operation is a multi-dimensional transform;

using the computer to construct and store a model data set from the raw data set, wherein:
  the model data set contains the incoherent noise features from the raw data set, and
  the model data set, when subjected to the integral transform operation, produces artefacts similar to the artefacts in the patterned data set;

using the computer to perform the integral transform operation on the model data set to create and store an incoherent noise model;

constructing and storing a scaling and energy minimizing filter from the patterned data set and the incoherent noise model;

applying the scaling and energy minimizing filter to the incoherent noise model to create and store a filtered incoherent noise model that is scaled with an exponential function of depth depending on an arrangement of the one or more seismic sources and the plurality of receivers; and adaptively subtracting the filtered incoherent noise model from the patterned data set to create and store a transformed data set with the incoherent noise features removed.

6. The method of claim 5, wherein the model data set is constructed by removing coherent energy events from the raw data set.

7. The method of claim 5, wherein the integral transform operation comprises a wavefield decomposition.

8. The method of claim 5, wherein the scaling and energy minimizing filter comprises a least-square error filter, and constructing and storing the scaling and energy minimizing filter from the patterned data set and the incoherent noise model comprises:

creating and storing a parametric incoherent noise model from the incoherent noise model, and constructing and storing the scaling and energy minimizing filter based on the parametric incoherent noise model.

9. The method of claim 5, further comprising performing an inverse of the transformation on the transformed data set to create and store a de-noised version of the raw data set.

10. The method of claim 5, wherein the raw data set comprises seismic data gathered over a geographic domain and a time domain, the model data set contains an incoherent noise sample extracted from the seismic data, and the incoherent noise model is adaptively subtracted from the patterned data set.

11. The method of claim 10, wherein the model data set has a domain that is the same as the domain of the seismic data, the incoherent noise model is parameterized by offsets in the geographic domain and time domains, and in amplitude, and the scaling and energy minimizing filter comprises a tensor dimensioned on the offsets and amplitude.

12. The method of claim 10, wherein the model data set has a domain that is the same as the domain of the seismic data, the scaling and energy minimizing filter comprises a Wiener filter, and the method further comprises:

constructing and storing a second model data set containing a second incoherent noise sample;

performing the integral transform operation on the second model data set to create and store a second incoherent noise model;

constructing and storing a second scaling and energy minimizing filter from the patterned data set and the second incoherent noise model;

applying the second scaling and energy minimizing filter to the second incoherent noise model to create and store a second filtered incoherent noise model; and adaptively subtracting the second filtered incoherent noise model from the patterned data set.

13. The method of claim 5, further comprising constructing a visual representation of the patterned data set using a graphical display.

14. A method of geophysical surveying, comprising:

collecting seismic data over a geographic area using an array of seismic sources and receivers;

compiling the seismic data into a raw data set; and removing incoherent noise from the raw data set according to the method of claim 5.

15. The method of claim 14, wherein at least some of the seismic sources and receivers are mobile.

16. A method of creating and storing a geographical data product, comprising:

collecting seismic data over a geographic area using an array of seismic sources and receivers;

compiling the seismic data into a data set;

removing incoherent noise from the data set according to the method of claim 5 to create and store a de-noised data set; and storing the de-noised data set on a physical non-transitory storage medium.

17. A method of removing incoherent noise from a raw data set containing information indicative of a geology of earth strata, the method comprising:

performing a wavefield decomposition on the raw data set to create and store a wavefield patterned data set, wherein the raw data set represents seismic waves resulting from designed seismic perturbations from one or more seismic sources, comprises pressure readings by a plurality of receivers, and is a function of three spatial dimensions and time;

performing an inversion of the wavefield decomposition on a de-noised data set;

constructing and storing a model data set containing an incoherent noise sample;

performing the wavefield decomposition on the model data set to create and store an incoherent noise model;

constructing and storing a scaling and energy minimizing filter from the wavefield patterned data set and the incoherent noise model;

applying the scaling and energy minimizing filter to the incoherent noise model to create and store a filtered incoherent noise model that is scaled with an exponential function of depth depending on an arrangement of the one or more seismic sources and the plurality of receivers; and adaptively subtracting the filtered incoherent noise model from the wavefield patterned data set to create and store the de-noised data set.

18. The method of claim 17, wherein the scaling and energy minimizing filter comprises a least-square error filter.

19. The method of claim 17, wherein the raw data set comprises seismic data gathered over a geographic domain and a time domain, the model data set contains an incoherent noise sample extracted from the seismic data, and the incoherent noise model is adaptively subtracted from the wavefield patterned data set.

20. The method of claim 17, wherein the model data set is constructed by removing coherent energy events from the raw data set.

21. A method of geophysical surveying, comprising:

collecting seismic data over a geographic area using an array of seismic sources and receivers;

compiling the seismic data into a raw data set; and removing incoherent noise from the raw data set according to the method of claim 17.

22. A method of removing incoherent noise from a raw data set containing information indicative of a geology of earth strata, the method comprising:

using a computer to perform a transformation on the raw data set representing seismic waves resulting from designed seismic perturbations from one or more seismic sources and comprising pressure readings by a plurality of receivers, the transformation comprising:

performing a wavefield decomposition on the raw data set to create and store a wavefield patterned data set;

extracting coherent energy signals from the raw data set to create and store a coherent model;

adaptively subtracting the coherent model from the raw data set to create and store an incoherent model;

performing the wavefield decomposition on the incoherent model to create and store an incoherent noise model;

constructing and storing a scaling and energy minimizing filter from the wavefield patterned data set and the incoherent noise model;

applying the scaling and energy minimizing filter to the incoherent noise model to create and store a filtered incoherent noise model that is scaled with an exponential function of depth depending on an arrangement of the one or more seismic sources and the plurality of receivers; and adaptively subtracting the filtered incoherent noise model from the wavefield patterned data set to create and store a de-noised data set; and using the computer to perform an inversion of the wavefield decomposition on the de-noised data set.

23. The method of claim 22, wherein the raw data set comprises seismic data gathered over a geographic domain and a time domain, and the incoherent noise model is adaptively subtracted from the wavefield patterned data set.

* * * * *